United States Patent [19]

Matoba et al.

[11] Patent Number: 5,083,301
[45] Date of Patent: Jan. 21, 1992

[54] OPTICAL CARD RECORDING AND REPRODUCING DEVICE

[75] Inventors: Hirotsugu Matoba, Sakurai; Shigemi Maeda, Yamatokoriyama; Kenji Ohta; Shozo Kobayashi, both of Nara, all of Japan

[73] Assignee: Sharp Kabushiki Kaisha, Osaka, Japan

[21] Appl. No.: 347,712

[22] Filed: May 5, 1989

[30] Foreign Application Priority Data

May 13, 1988 [JP] Japan ................... 63-117465

[51] Int. Cl.$^5$ .............. G11B 7/00; G06K 13/00; G06K 7/10; G01V 5/00
[52] U.S. Cl. .................. 369/32; 369/44.28; 369/47; 369/124; 235/479; 235/476; 235/454; 250/261
[58] Field of Search .......... 369/32, 46, 44.28, 47, 369/44.39, 44.27, 44.14, 124; 235/454, 456, 479, 476, 475; 250/561, 557

[56] References Cited

U.S. PATENT DOCUMENTS

| | | | |
|---|---|---|---|
| 4,511,930 | 3/1985 | Lemelson | 369/32 |
| 4,796,242 | 1/1989 | Pierce | 369/32 |
| 4,800,546 | 1/1989 | Shikichi et al. | 369/44.28 |
| 4,817,067 | 3/1987 | Takahashi et al. | 369/32 |
| 4,864,113 | 9/1989 | Ogura | 235/436 |
| 4,888,753 | 12/1989 | Enari et al. | 369/47 |
| 4,952,786 | 8/1990 | Inoue | 235/454 |

FOREIGN PATENT DOCUMENTS

112464 6/1984 Japan .................. 369/47

Primary Examiner—Roy N. Envall, Jr.
Assistant Examiner—Nabil Hindi

[57] ABSTRACT

An optical card recording and reproducing device including an optical head for emitting a light beam spot to the optical card having a plurality of parallel data tracks to which data is recorded; a transfer system for transferring the optical card and/or the optical head; and a track number confirmation means for confirming the track number recorded in the address data area in the data track of the optical card. The optical card recording and reproducing device also includes a transfer stopping means for stopping the optical head when an incorrect track number is deleted. The system minimizes the relative transfer distance between the optical card and the optical head, and at the same time, the total relative transfer distance of the optical card and/or the optical head when confirming the track number more than twice. Thus, the total time required for track number confirmation can be greatly shortened.

8 Claims, 9 Drawing Sheets

OPTICAL CARD RECORDING AND REPRODUCING DEVICE

FIELD OF THE INVENTION

The present invention is related to an optical card recording and reproducing device that records and/or reproduces data by emitting an optical beam spot to an optical card.

BACKGROUND OF THE INVENTION

Figure 7:
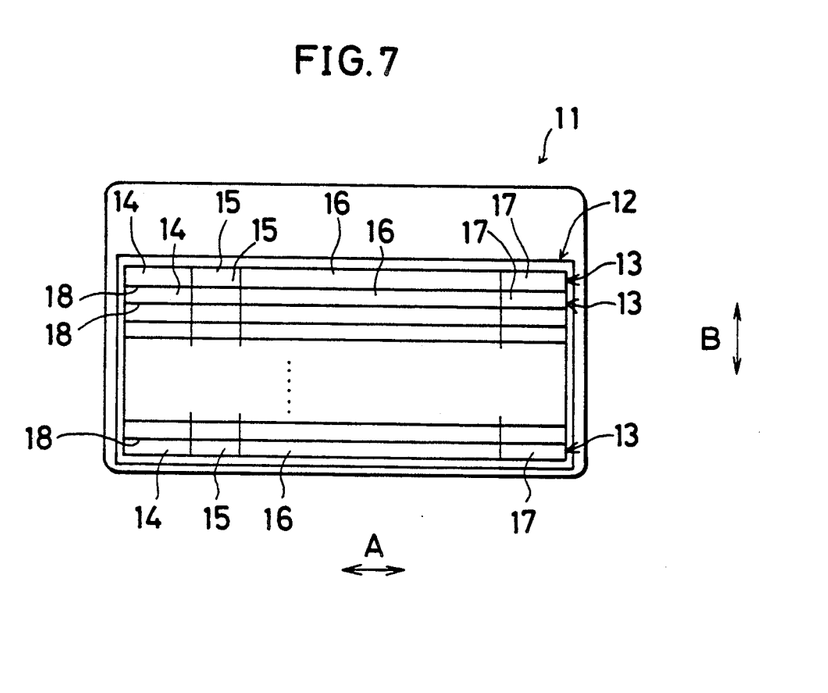
FIG. 7 is a plan view showing the optical card construction and the data recording format commonly used in the optical card recording and reproducing device shown in an embodiment of the present invention and the conventional example.

With reference to FIG. 7, in an optical card 11, which records and reproduces data by emitting an optical beam spot, a data area 12 for receiving data to be recorded is created on the recording medium surface. In this data area 12, more than two data tracks 13 . . . , extending in a direction A, and arranged in parallel in a direction B. Tracking guides 18 being disposed between individual data tracks 13.

The aforementioned individual data tracks 13 include an acceleration area 14, an address data area 15 (in which track numbers for distinguishing each data tract 13 is to be recorded) a data area 16 (in which recording data is to be recorded) and a deceleration area 17 arranged in the order.

Figure 8:
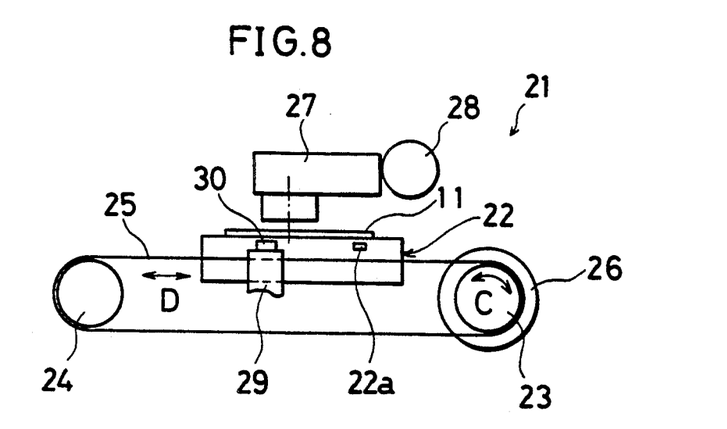
FIG. 8 is an illustrative view showing the construction of a conventional optical card recording and reproducing device.

Currently, when recording and/or reproducing data shown in such an optical card 11, for example, an optical card recording and reproducing device 21 has been used, as shown in FIG. 8. This optical card recording and reproducing device 21 comprises a stage 22, on which the optical card 11 is placed with its recording medium surface facing up. This stage 22 is set on a belt 25 which is looped between pulleys 23-24. To the side of the stage 22, a protruding light shield 22a is set, and on a frame 29, a photo-interrupter 30 is set. To an optical card transfer motor 26 is connected to pulley 23 for moving the stage 22 in a direction D by rotating this pulley 23 in a C direction C, and for transferring the optical card 11 and later mentioned optical head 27 in a direction relatively toward the data track 13 of the optical card 11.

Above the stage 22 is set the light head 27 for recording and/or reproducing data by emitting a light beam spot to the optical card 11. In the optical head 27, an auto focus drive is set (not shown), which automatically allows an appropriate light beam spot to be emitted to the recording medium surface of the optical card 11. Also, in the optical head 27, an auto tracking device (not shown) performs auto tracking for accurate light beam spot emissions between the respective tracking guides 18 in the optical card 11. Moreover, the optical head 27 is driven by a head transfer motor 28, and can move in a right angle direction from the direction D.

Figure 9:
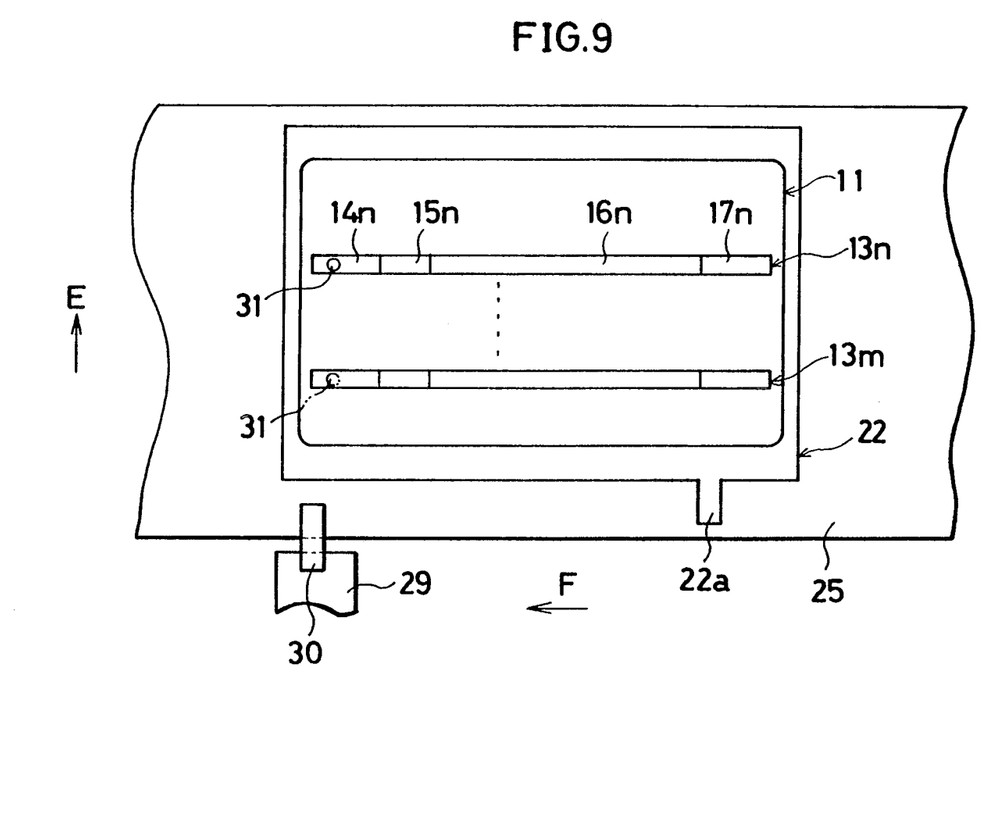
FIG. 9 and FIG. 10 respectively are illustrative views showing the operation of a conventional optical card recording and reproducing device when the track number recorded in the address data area is confirmed.

As shown in FIG. 9 by the optical card recording and reproducing device 21, and its optical head 27 are moved in a predetermined manner when the light beam spot 31 is emitted to a data track 13m is changed to focus on data track 13n. This is to say, when the condition where data recording and/or reproducing can be done to data track 13m is changed to the condition where data recording and/or reproducing can be done to a different data track 13n, the following operation will be done.

First, by driving the head transfer motor 28, the optical head 27 is transferred in a E direction E for a distance corresponding to the distance between the data track 13m and the data track 13n. Then, by driving the optical card transfer motor 26, the optical card 11 moves with the stage 22 to the direction F the acceleration area 14n, the address data area 15n, and the data area 16n, the light beam spot 31 are sequentially scanned and emitted to data track 13n, and the data recorded in the address data area 15n and the data area 16n is reproduced.

Figure 10:
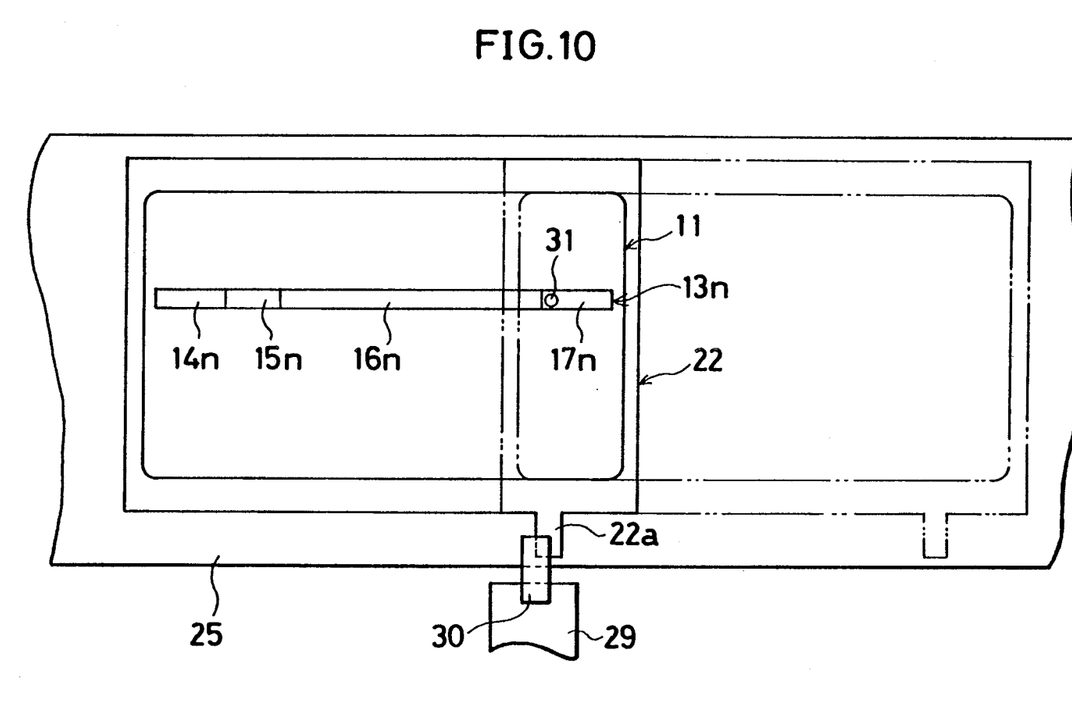

If the optical card 11 and stage 22 are moved to a location where the light beam spot 31 can be emitted to the deceleration area 17n of the data track 13n, as shown in FIG. 10, the light shield 22a of the stage 22 crosses a photo-interrupter 30. Because of this, the optical card transfer motor 26 is stopped, and the optical card 11 and stage 22 are stopped at the location where the light beam spot 31 is emitted to the deceleration area 17n.

Then, the track number reproduced from the address data area 15n is collated, and confirmation is made whether the track number is n or not. If it is confirmed that the track number is n, the optical head 27 transfer operation is completed In other words, the light beam spot is emitted to the data track 13n, and the condition is such that data recording and/or writing can be done to, this track 13n.

Additionally, if a transfer error of the optical head 27 by the head transfer motor 28 occurs, causing a distance dispersion between the data track 13m and the data track 13n of the optical card 11, or the like, the data track 13 receiving the light beam spot 31 emissions may become a different track than the requested data track 13n causing the reproduced track number to be different than n. In this case, the optical head 27 is further transferred just a little, and the track number recorded in the adjoining other data track 13 is reproduced. The aforementioned operation will be repeated until the track number recorded in the requested data track 13n is reproduced. When the reproduced track number is confirmed as n, the transfer operation of the optical head 27 is completed.

However, in the aforementioned conventional optical card recording and reproducing device, the optical card 11 is transferred until the location where the light beam spot 31 is emitted reaches the deceleration area 17 from the data area 16, even in the case when the data track 13 in which data is reproduced, and it is not the requested data track 13n. Therefore, it takes a long time to confirm the track number recorded in the address data area 15, concerning one data track 13.

Especially, when the aforementioned track number confirmation operation is done more than twice, because the data track 13 to which the light beam spot is emitted is different from the requested data track 18n, time for the optical card 11 to transfer is accumulated, and access time before the required recording data ca be recorded and/or reproduced becomes drastically long and very inefficient. This has been a problem.

SUMMARY OF THE INVENTION

An object of the present invention is to control the relative moving distance between an optical card and an optical head to be as short as possible, by stopping a transfer means after an optical beam spot has passed through an address data area, at least in the case when a reproduced track number is not a requested track number, this when the track number is reproduced to confirm the track number recorded in the address data area of the data track of the optical card.

Another object of the present invention is to shorten the time required for confirming the track number, by controlling the relative transfer distance between an optical card and an optical head to be as short as possible.

Still another object of the present invention is, when a reproduced track number is different than a requested track number, that is, when a track number confirmation operation is done more than twice because the track to which the light beam spot is emitted to is not the requested track, that the light beam spot is made to quickly move to another track and perform the track number confirmation operation.

A further object of the present invention is to drastically shorten the total relative transfer distance between the optical card and the optical head, and the total time required to confirm the track number, by making the light beam spot quickly move to another track, and perform the track number confirmation operation, when the reproduced track number is different than the requested track number.

Still a further object of the present invention is, when the reproduced track number is the requested track number, to shorten not only the time required to confirm the track number, but also to drastically shorten the time required for recording and/or reproducing data to the data area, by making it possible to continue the operation of the transfer means for moving the optical card and the optical head relative to the optical card data track direction.

Still a further object of the present invention is to simplify the construction by realizing a common operation routine in the transfer stopping means for stopping the operation of the aforementioned transfer system.

To accomplish these objects, the optical card recording and reproducing device related to the present invention comprises, an optical head, which emits a light beam spot to the optical card that comprises a plurality of two parallel installed data tracks for data to be recorded, a transfer means, which transfers the optical card and/or the optical head relative to the data track direction of the optical card, and a track number confirmation means, which confirms the track number recorded in the address data area in the data track of the optical card. In the optical card recording and reproducing device which records and/or reproduces data to the optical card, when the track number recorded in the address data area is reproduced in order to confirm the track number, and at least when the reproduced track number is not the requested one, the aforementioned transfer means is stopped after the light beam spot has passed through the address data area. A special feature of this device includes such a transfer stopping means.

The aforementioned transfer stopping means can be constructed such that when the track number recorded in the address data area is reproduced in order to confirm the track number, the aforementioned transfer means can be stopped after the light beam spot has passed through the address data area in both of the cases when the reproduced track number is the requested number, and when it is not the requested number Also, the aforementioned transfer stopping means can be structured such that when the track number recorded in the address data area is reproduced in order to confirm the track number, the aforementioned transfer means is stopped after the light beam spot has passed through the address data area, if the reproduced track number is not the requested track number. On the other hand, the operation of the transfer means continues after the light beam spot has passed through the address data area, if the reproduced track number is the requested track number.

The optical card recording and reproducing device can be constructed such that, for example, a scale formed of more than two slits is installed on a stage part on which the optical card is placed or a photo-interrupter placed on the container part of the optical card recording and reproducing device, which outputs pulse signals every time each slit of the scale passes accompanied with a stage transfer, and according to the pulse signal number output from the photo-interrupter, the aforementioned transfer means is stopped by detecting the transfer distance of the stage as well as detecting whether the light beam spot has passed through the data area. Also, the aforementioned transfer means comprises, for example, an optical card transfer motor, which is controlled by the optical card transfer motor control circuit, that transfers the optical card in the data track direction for the optical head. The aforementioned optical head is equipped with, for example, an auto focus mechanism, which automatically emits an appropriate light beam spot on the recording medium surface of the optical card, and an auto tracking mechanism, which accurately emits a light beam spot between tracking guides of the optical card. Also, the aforementioned optical head is constructed, for example, to be driven by the head transfer motor which is controlled by the head transfer motor control circuit, to be transferred in a direction at right-angles relative to the transfer direction of the optical card and the optical head. The optical card recording and reproducing device related to the present invention is not, however, limited to the concrete constructions described above. The aforementioned constructions are merely illustrative of one preferred embodiment of the invention disclosed herein.

BRIEF DESCRIPTION OF THE DIAGRAMS

FIGS. 1 through 6 show an embodiment of the present invention.

DESCRIPTION OF THE EMBODIMENTS

An example as an embodiment of the present invention is described below with reference being made to FIG. 1 through 7.

The optical card 11 that records and/or reproduces data by the emission of a light beam spot, for example, as shown in FIG. 7, include a data area 12 in which the data is recorded on the recording medium surface. In this data area 12, at least two data tracks 13 extending to direction A are arranged and set parallel to each other in a direction B. Between the individual data tracks 13, tracking guides 18 are set.

Each aforementioned data track 13 includes an acceleration area 14, an address data area 15 (where the track number for distinguishing each data track 13 is recorded) a data area 16 (when recording data is recorded) and a deceleration area 17, in this sequence.

Figure 1:
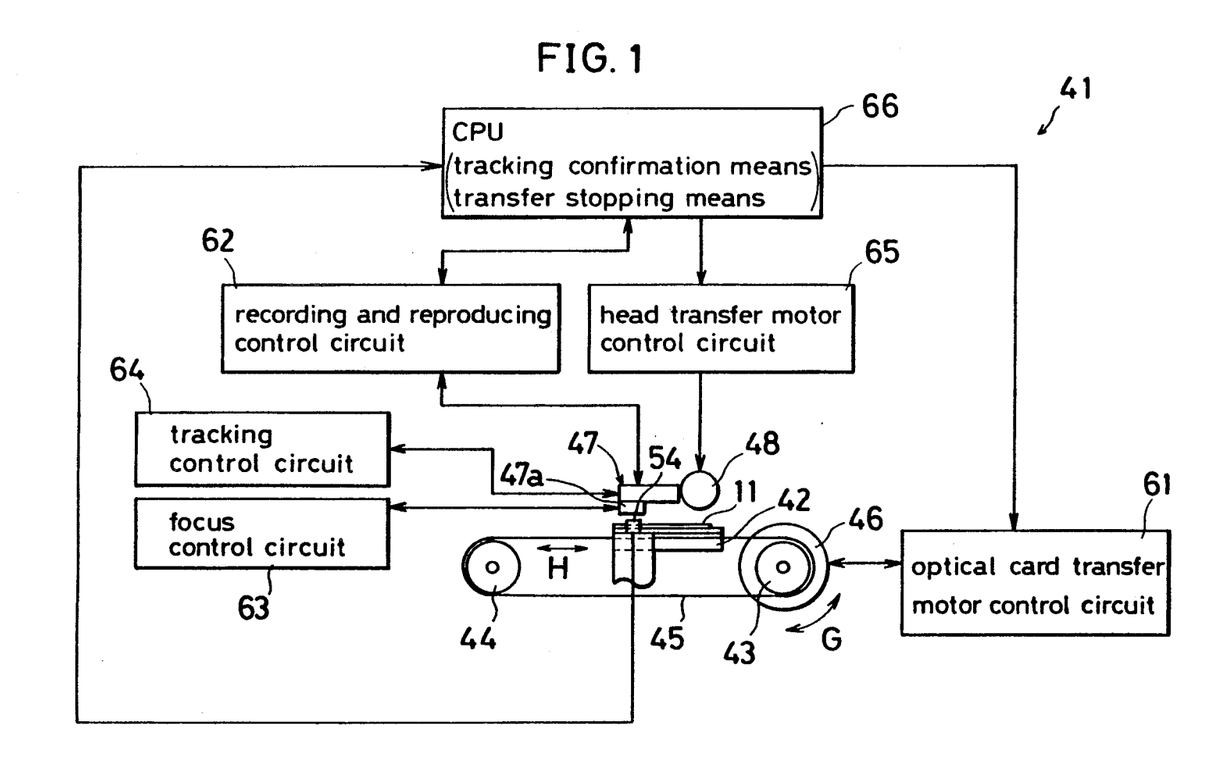
FIG. 1 is an illustrative view showing the optical card recording and reproducing device construction.

As shown in FIG. 1, for example, the optical card recording and reproducing device 41 which records and/or reproduces data to the aforementioned optical card 11, has a stage 42 on which the optical card 11 is placed with the recording medium surface thereof facing up. This stage 42 is installed to the belt 45, which is looped around the pulleys 43–44. To one pulley 43, the optical card transfer motor 46 is connected; this is a transfer means that transfers the optical card 11 and the later mentioned optical head 47 relative to the data track 13 in the direction of the optical card 11, by rotating the pulley 43 in a direction G and transferring stage 42 to in a direction H. The optical card transfer motor 46, as the transfer means, is arranged to be controlled by the optical card transfer motor control circuit 61.

Figure 2:
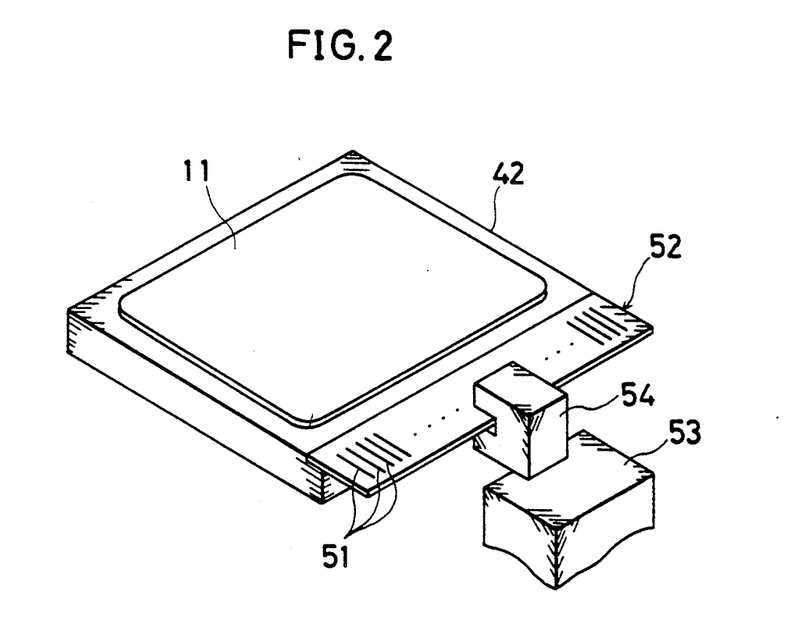
FIG. 2 is a perspective view showing detailed construction of the scale and the photo-interrupter.

On the side of the aforementioned stage 42, as shown in FIG. 2, a scale 52 is installed, with at least two slits 51 formed at an accurate pitch. On the other hand, on the frame 53, which defines the container of the optical card recording and reproducing device 41, the photo-interrupter 54 is installed. The photo interrupter 54 outputs pulse signals every time each slit 51 of scale 52 passes by when the stage 42 transfers in a direction H.

Above the stage 42, the optical head 47 is equipped, which records and/or reproduces data by emitting a light beam spot to the optical card 11 controlled by the recording and reproducing control circuit 62. In the optical head 47, an auto focus mechanism 47a is installed that automatically emits the appropriate light beam spot to the recording medium surface of the optical card 11 according to the control of the focus control circuit 63. In the optical head 47, the auto tracking mechanism (not shown), is also installed, which performs auto tracking in order to accurately emit a light beam spot to the point between the tracking guides 18 of the optical card 11, according to the control of the tracking control circuit 64. The optical head 47 is transferred to a direction perpendicular from the direction H driven by the head transfer motor 48. This head transfer motor 48 is driven the head transfer motor control circuit 65.

The aforementioned head transfer motor control circuit 65, the aforementioned optical card transfer motor control circuit 61, the recording and reproducing control circuit 62, and the photo-interrupter 54 are connected to the CPU 66. This CPU 66 is constructed to control the aforementioned individual control circuits, as well as to detect the transfer amount to the direction H of the stage 42, by counting the pulse signals output from the photo-interrupter 54. CPU 66 is also equipped with a track number confirmation means for confirming the track number recorded in the address data area 15 in data tracks 13 of the optical card 11.

The aforementioned CPU 66 is also equipped with a transfer stopping means, which stops the optical card transfer motor 46 after the light beam spot has passed through the address data area 15, at least in the case when the reproduced track number is not the requested track number when the track number recorded in the address data area 15 is reproduced in order to confirm the track number.

In other words, the aforementioned transfer stopping means comprised in the CPU 66 includes the construction that when the track number recorded in address data area 15 is reproduced order to confirm the track number, in both cases when the reproduced track number is the requested track number, and in the case when it is not the requested track number, the aforementioned optical card transfer motor 46 can be stopped after the light beam spot has passed through the address data area 15. Also, the aforementioned transfer stopping means includes the construction that When the track number recorded in the address data area 15 is reproduced in order to confirm the track number, the aforementioned optical card transfer motor 46 is stopped after the light beam spot has passed through the address data area 15, if the reproduced track number is not the requested track number, and on the other hand, if the reproduced track number is the requested track number, the optical card transfer motor 46 can continue operation and record and/or reproduce to the requested data track after the light beam spot has passed through the address data area 15.

Figure 3:
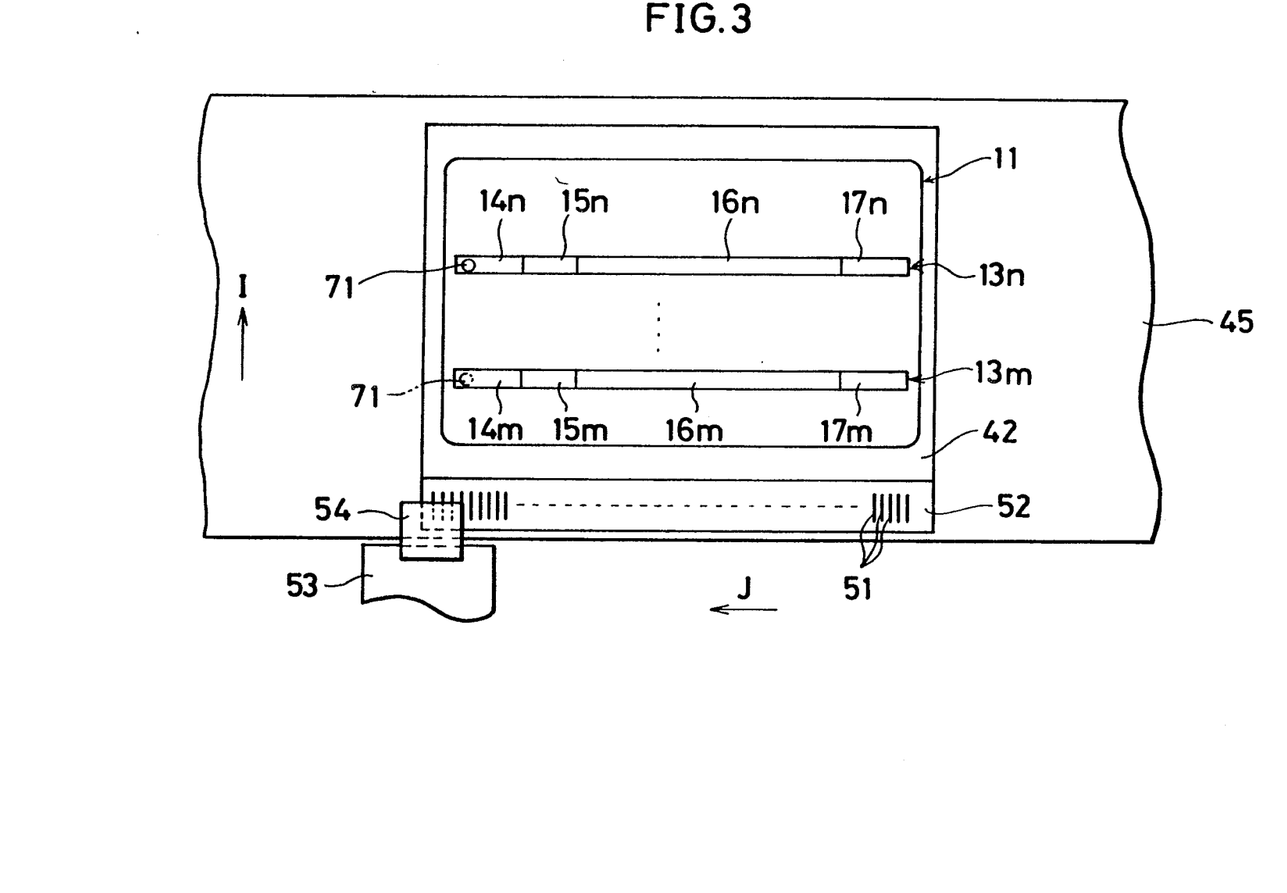
FIG. 3 and FIG. 4 respectively are illustrative views showing the operation of the optical card recording and reproducing device when the track number recorded in the address data area is confirmed.

In the aforementioned construction, as shown in FIG. 3 for example, when the condition in which the light beam spot 71 from the optical head 47 is emitted to the data track 13m, which comprises the acceleration area 14m, the address data area 15m, the data area 16m, and the deceleration area 17m, that is, the condition in which recording and/or writing data can be done to the data track 13m, is changed to the condition in which recording and/or writing data can be done to a different data track 13n by transferring the optical head 47, the operation is as follows.

Firstly the head transfer motor 48 transfers the optical head 47 in a I direction I for the distance between the data track 13m and another data track 13n. At this time, the tracking control circuit 64 automatically tracks the optical head, the light beam spot 71 is accurately emitted to a point between the tracking guides 18 of the optical card 11. Also, the focus control circuit 63 assures that the appropriate light beam spot 71 is automatically emitted to the recording medium surface of the optical card 11.

Then, the optical card transfer motor 46 transfers the optical card 11 with stage 42 in a direction J, and the light beam spot 71 is scanned and emitted to the data track 13n in the following sequences, the acceleration area 14n and the address data area 15n. Here, since the stage 42 reaches a constant speed while the light beam spot 71 is emitted to the acceleration area 14n, the address data area 15n is scanned at a constant speed by the light beam spot 71, and the data recorded in the address data area 15n is reproduced.

Figure 4:
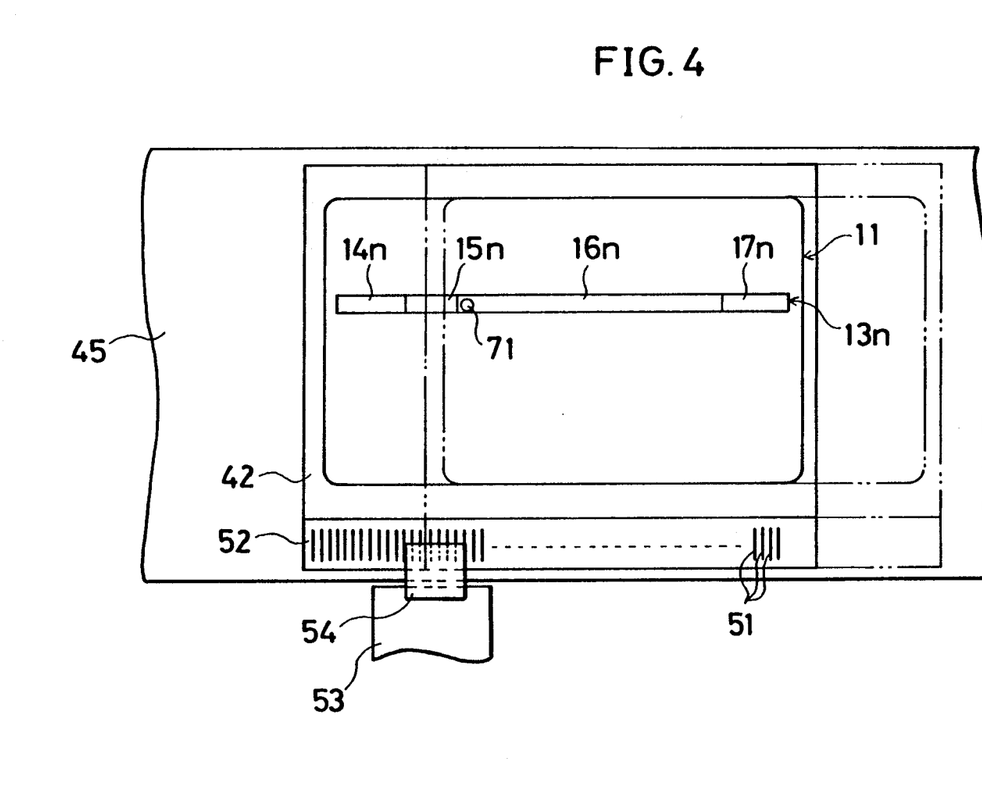

As shown in FIG. 4, if the optical card 11 and the stage 42 transfers to the location where the light beam spot 71 can be emitted to the data area 16n of the data track 13n, the CPU 66 detects that the light beam spot 71 has passed through the address data area 15n, according to the number of the pulse signal output from the photo-interrupter 54, and stops the optical card transfer motor 46. By this, the optical card 11 and the stage 42 are decelerated to a stop at the location where the light beam spot 71 is emitted to the data area 16n.

Then, the CPU 66 collates the track number reproduced from the address data area 15n, and confirms if the track number is n. If it is confirmed that the track number is n, the optical head 47 transfer operation is completed. Thus, when the track number is reproduced in order to confirm the track number recorded in the address data area 16 in the data track 13 of the optical card 11, the transfer of the optical card 11 stops after the light beam spot 71 has passed through the address data area 15, therefore, the relative transfer distance between the optical card 11 and the optical head 47 can be controlled to be as short as possible.

By the way, due to the transfer error of the optical head 47 caused by the head transfer motor 48, distance dispersion between the data track 13m and the data track 13n of the optical card 11, or the like, the data track to which the light beam spot 71 is emitted may not become the requested track 13n, in this case, the reproduced track number does not become n.

In such a case, the optical card transfer motor 46 returns the optical card 11 and the stage 42 in the opposite direction to the direction J. At the same time, the head transfer motor 48 transfers the optical head 47 a very small distance, and the light beam spot 71 is emitted to the edge of the acceleration area 14 of the adjoining data track 13 opposite to the address data area 15. After this, the track number recorded in the address data area 15 of the aforementioned adjoining data track 18 is reproduced, and the same operation will be repeated until the track number recorded in the requested data track 13n will be reproduced.

Especially in the aforementioned case, since the relative transfer distance of the optical card 11 and the optical head 47 is controlled to be as short as possible, every time the track number confirmation operation is done, total relative transfer distance of the optical card 11 and the optical head 47 and the total time required for track number confirmation are drastically shortened.

Secondly, as described above, after it is in the condition that the light beam spot 71 from the optical head 47 is emitted to the requested data track 13n, in the case when the data recording and/or reproducing is performed to the data track 13n, the operation is as follows.

Figure 5:
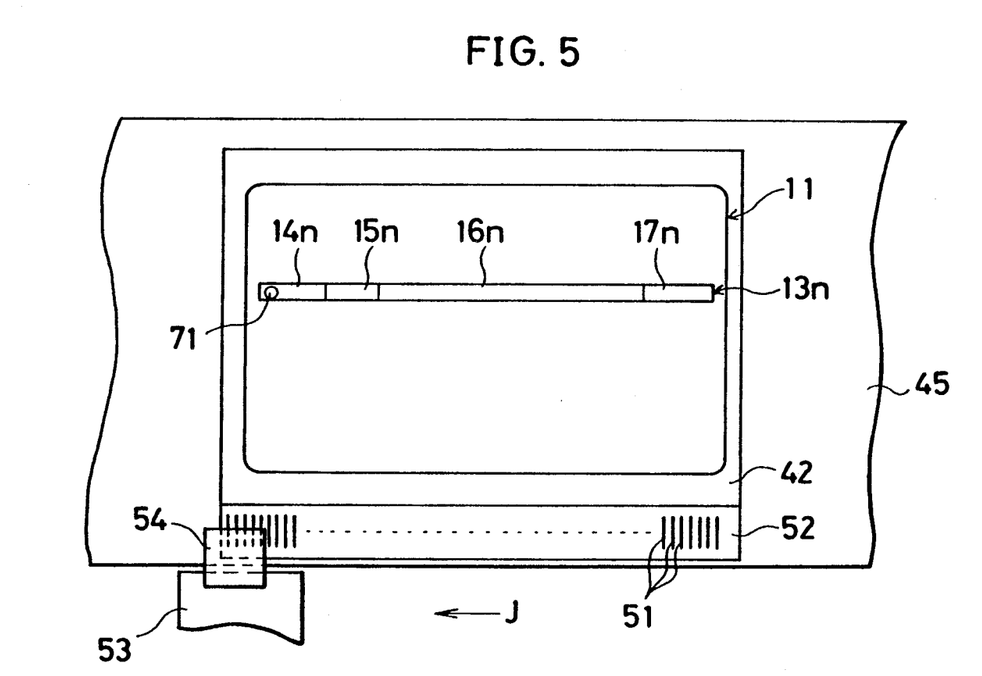
FIG. 5 and FIG. 6 respectively are illustrative views showing the operation of the optical card recording and reproducing device operation when data is recorded and/or reproduced to the optical card.

First, the optical card transfer motor 46 transfers the optical card 11 together with the stage 42, and as shown in FIG. 5, the light beam spot 71 is emitted to the edge of the opposite side in the acceleration area 14n to the address data area 15n. Then, the optical card transfer motor 46 moves the optical card 11 in the direction J together with the stage 42, and the light beam spot 71 is scanned and emitted to the data track 13n, in the sequence of the acceleration area 14n, the address data area 15n, then the data area 16n. Since the stage 42 reaches a constant speed while the light beam spot 71 is emitting to the acceleration area 14n, the address data area 15n and the data area 16n are scanned by the light beam spot 71 at a constant speed, and the data recorded in each area is reproduced or the recording data is recorded to the data area 16.

Figure 6:
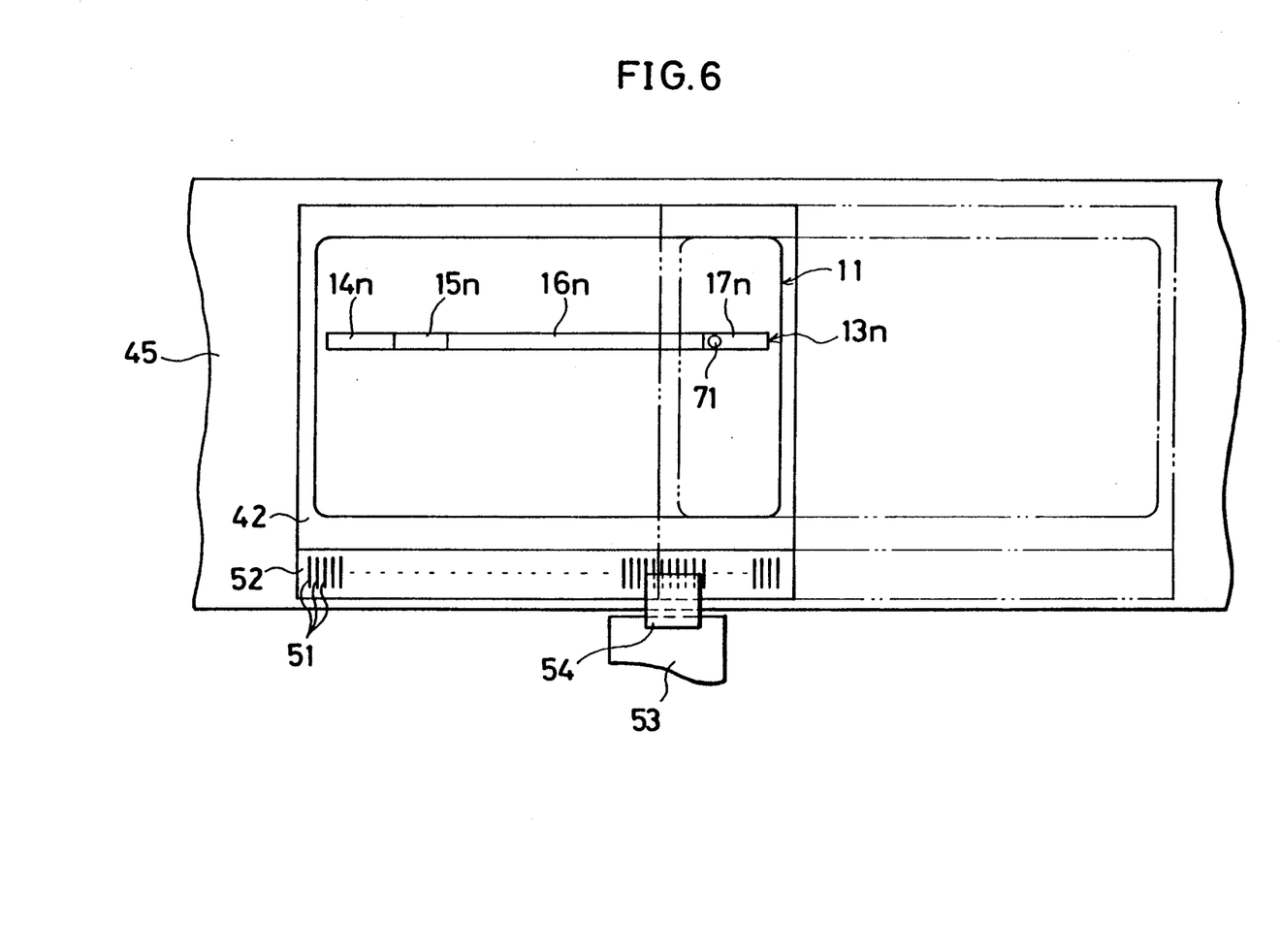

As shown in FIG. 6, when the optical card 11 and the stage 42 transfers to the location where the light beam spot 71 can be emitted to the deceleration area 17n in the data track 13n, the CPU 66 detects that the light beam spot 71 has passed through the data area 16n according to the number of pulse signals output from the photo-interrupter 54, and stops the optical card transfer motor 46. By this, the optical card 11 and the stage 42 are decelerated and stopped at the location where the light beam spot 71 is emitted to the deceleration area 17n.

In the aforementioned preferred embodiment, the transfer stopping means comprised in the CPU 66 is constructed so that when the track number recorded in the address data area 15 is reproduced in order to confirm the track number, in both cases when the reproduced track number is the requested track number and in the case when the reproduced track number is not the requested track number, the aforementioned optical card transfer motor 46 is stopped after the light beam spot has passed through the address data area 15. However, it is not limited to this construction. For example, the transfer stopping means comprised in CPU 66 can be constructed so that when the track number recorded in the address data area 15 is reproduced in order to confirm the track number, and if the reproduced track number is not the requested track number, the aforementioned optical card transfer motor 46 is stopped after the light beam spot has passed through the address data area 15, or if the reproduced track number is the requested track number, after the light beam spot has passed through the address data area 15, the operation of the optical card transfer motor 46 can be still continued and recording and/or reproducing data can be done to the requested data track.

As mentioned thus far, the optical card recording and reproducing device related to the present invention includes an optical head, which emits a light beam spot to the optical card comprised of a plurality of parallel data tracks where data is recorded, a transfer means, (which transfers the optical card and/or the optical head in the data track direction of the optical card), and a track number confirmation means (which confirms the track number recorded in the address data area of the data track of the optical card). The optical card recording and reproducing device, which records and/or reproduces data to the optical card, includes a transfer stopping means. That is, when the track number recorded in the address data area is reproduced in order to confirm the track number, at least when the reproduced track number is not the requested track number, the transfer stopping means stops the aforementioned transfer means after the light beam spot has passed through the address data area.

By this, when the track number is reproduced to confirm the track number recorded in the address data area of the data track of the optical card, at least when the reproduced track number is not the requested track number, the transfer means stops after the light beam spot has passed through the address data area, therefore, the relative transfer distance of the optical card and the optical head can be controlled to be minimal, and can easily shorten the time required for track number confirmation.

Especially, when the reproduced track number is different from the requested track number, that is, when the track number confirmation operation is done more than twice because the track to which the light beam spot is emitted is not the requested track, the light beam spot can be transferred to another track immediately and perform the track number confirmation operation, therefore, the total relative transfer distance of the optical card and the optical head, and the total time required for the t rack number confirmation operation can be drastically shortened.

Also, the aforementioned transfer stopping means can make an operation routine of the transfer stopping means common, by constructing such that the aforementioned transfer means is stopped after the light beam spot has passed through the address data area in both cases: When the reproduced track number is the requested track number, and when it is not the requested track number. This makes it possible to simplify the construction. By constructing that the aforementioned transfer means stops after the light beam spot has passed through the address data area, only when the reproduced track number is not the requested track number, and the operation of the aforementioned transfer means continues when the reproduced track number is the requested track number, the time required for the track number confirmation operation can be shortened, and also the time required for recording and/or reproducing data to the data area can be drastically shortened.

What is claimed is:

1. An optical card recording and reproducing device comprising:
    optical head means for emitting a light beam spot to an optical card while moving across said card at a desired speed, said card having at least two substantially parallel aligned data tracks wherein said data is recorded, each of said tracks sequentially including an acceleration sector for allowing the optical head means to accelerate to said desired speed prior to emitting said light, an address and track identification section for storing a track identifier, a data sector in which data is recorded and a deceleration sector for allowing the optical head means to decelerate after passing through said acceleration sector, address and track identification sector and data sector;
    a transfer means for transferring said optical card and said optical head means along a selected one of said data tracks when recording or reproducing data from said tracks; and
    a track number confirmation means for confirming the track identification recorded in said address and track identification sector located in the data track of said optical card; and
    a transfer stopping means, responsive to said track confirmation means for stopping said transfer means after the light beam spot has passed through said address and track identification sector if it is determined that the track identification is not the appropriate track on which information is to be recorded or reproduced without proceeding to said data and deceleration sectors and causing said transfer means to move said optical head means and said light beam to an adjacent track.

2. An optical card recording and reproducing device according to claim 1, wherein said transfer stopping means stops said transfer means after the light beam spot has passed through said address and track identification sectors; and completes the scan of said data sector and deceleration sector if the reproduced track identification is the appropriate track number.

3. An optical card recording and reproducing device according to claim 1, wherein said transfer means further comprises a stage for supporting said optical card on which is formed a scale defined by a plurality of slits; and
    photo-interrupter means for outputting pulse signals each time a slit of said scale passes said photo-interrupter means, so as to detect the transfer distance of the stage with respect to said optical head as well as to detect whether the light beam spot has passed through the address and track identification sector according to said pulse signal for stopping said transfer means at a designated point along said scale.

4. An optical card recording and reproducing device according to claim 1, wherein said transfer means further comprises:
    control means responsive to said photo-interrupter means for controlling movement of said optical card and said optical head means;
    an optical card transfer motor for transferring said optical card on said stage relative to said optical head means; and
    an optical card transfer motor control circuit means for controlling said optical card transfer motor responsive to said control means.

5. An optical card recording and reproducing device according to claim 1, wherein said optical head means further comprises auto focus mechanism means for automatically emitting an appropriate light beam spot to the recording medium surface of said optical card, and
    auto tracking mechanism means for accurately emitting a light beam spot to a point between the tracking guides of said optical card.

6. An optical card recording and reproducing device according to claim 1, wherein said optical head means further comprises:
    head means transfer motor means for moving said optical head with respect to said optical card; and
    head transfer motor control circuit means for controlling said head transfer motor responsive to said control means.

7. An optical card recording and reproducing device which records and reproduces information on and from an optical card provided thereon with a plurality of tracks for permitting information to be recorded therein, disposed in parallel, each track having an address data area wherein information indicating a track number is recorded, comprising:
    optical head means for emitting a light beam spot to the optical card;
    transfer means for relative transferring the optical card and the optical head means in a data track direction of the optical card;
    track number confirmation means for confirming whether or not a reproduced track number coincides with a target track number as an address data area is reproduced by the optical head means;
    position detection means for detecting an instantaneous position in the data track direction of the optical head means; and
    means for stopping or transferring the transfer means according to an output of the position detection means, wherein the means for stopping or transferring the transfer means is designed so as to stop the transfer means as the position detection means detects that the optical head means has passed through an address data area.

8. An optical card recording and reproducing device which records and reproduces information on and from an optical card provided thereon with a plurality of tracks for permitting information to be recorded therein, disposed in parallel, each track having an address data area wherein information indicating a track number is recorded, comprising:

optical head means for emitting a light beam spot to the optical card;

transfer means for relative transferring the optical card and the optical head means in a data track direction of the optical card;

track number confirmation means for confirming whether or not a reproduced track number coincides with a target track number as an address data area is reproduced by the optical head;

position detection means for detecting an instantaneous position in the data track direction of the optical head means; and means for stopping or transferring the transfer means according to an output of the position detection means, wherein the position detection means comprises a stage member whereon an optical card is placed and a photo-interrupter having a light emitting element and a light receiving element, said stage member having a scale installed thereon, said scale having a plurality of slits, whereby, while said stage member moves, control of said transfer means is provided based on pulse signals, each released from said photo-interrupter every time light emitted from said light emitting element passes through one of said slits formed in said scale and is received by said receiving element.

* * * * *